United States Patent
Haberle

(10) Patent No.: US 6,280,133 B1
(45) Date of Patent: Aug. 28, 2001

(54) SCREW INCLUDING A MOLDABLE MASS TO SECURE THE SCREW AGAINST UNINTENDED LOOSENING

(76) Inventor: Günther Haberle, 2 Sarah Crescent, Templestowe, Victoria 3106 (AU)

( * ) Notice: Subject to any disclaimer, the term of this patent is extended or adjusted under 35 U.S.C. 154(b) by 0 days.

(21) Appl. No.: 09/442,742

(22) Filed: Nov. 18, 1999

(30) Foreign Application Priority Data

Jul. 6, 1999 (DE) ............................................. 199 30 905

(51) Int. Cl.⁷ .................................................. F16B 35/02
(52) U.S. Cl. ...................... 411/392; 411/285; 411/304; 411/419
(58) Field of Search .................... 411/301, 302, 411/304, 324, 385, 82, 258, 418, 419, 392

(56) References Cited

U.S. PATENT DOCUMENTS

| | | | |
|---|---|---|---|
| 2,407,160 | * | 9/1946 | Kahn ..................... 411/301 |
| 2,568,640 | * | 9/1951 | Kindelberger . | |
| 2,677,146 | * | 5/1954 | Fineran ................. 411/301 |
| 2,804,115 | * | 8/1957 | Damm ................... 411/304 |
| 2,852,056 | * | 9/1958 | Rapata ................... 411/304 |
| 3,202,194 | * | 8/1965 | Jones . | |
| 3,351,966 | * | 11/1967 | Pelochino ............. 411/301 |
| 4,712,957 | * | 12/1987 | Edwards ............... 411/258 |
| 4,822,225 | | 4/1989 | Haberle . | |
| 5,193,958 | * | 3/1993 | Day . | |

FOREIGN PATENT DOCUMENTS

| | | |
|---|---|---|
| 38 12 111 | 1/1989 | (DE) . |
| WO 98/34034 | 8/1998 | (WO) . |

OTHER PUBLICATIONS

"Screw with groove and insert for the possibility of securing also in cases of vigorous vibration", Maschinenmarkt, Würzburg 89, 1983, p. 1679.

"The idea to hold in place", Long–Lok, Schraubenversicherungen GmbH, Eppertshausen.

* cited by examiner

*Primary Examiner*—Flemming Saether
(74) *Attorney, Agent, or Firm*—Crowell & Moring LLP

(57) ABSTRACT

A screw with a threaded shaft which has a slot running lengthwise dividing the threaded shaft into two shaft halves. A deformable mass is provided in the slot and fills the slot. This mass prevents the screw threaded into a threaded hole or application-related cored hole from loosening by itself.

12 Claims, 1 Drawing Sheet

SCREW INCLUDING A MOLDABLE MASS TO SECURE THE SCREW AGAINST UNINTENDED LOOSENING

This application claims the priority of German patent application number 199 30 905.1, filed Jul. 6, 1999, the disclosure of which is expressly incorporated by reference herein.

BACKGROUND AND SUMMARY OF THE INVENTION

This invention relates to a screw with a threaded shaft which has a slot running longitudinally which divides the threaded shaft into two halves.

A screw is known from DE 38 12 111 C2 corresponding to U.S. Pat. No. 4,822,225 which can be inserted especially quickly into a threaded hole or application-related cored hole because it does not have to be threaded into it at the beginning, but needs merely to be pushed into it axially at first, letting the threads of the screw slip over the threads of the hole. When screws of the above kind are used at places where vibration and oscillation occur there is the danger of accidental loosening of the screws in the course of time. It is, therefore, necessary to secure the screws against unintended loosening.

Very different means are known for securing screws. It is common, for example, to slip a spring or lock washer onto the threaded shaft to produce a bias force on the screw head when the screw is tightened. Another common method of screw locking consists in binding the screw head to the surface with a lacquer against which it presses when the screw is tightened. The known screw locks involve relatively great additional work, so that for cost reasons such screw locks are not applied and instead the risk of unintentional loosening of the screws is accepted.

This invention is addressed to the problem of designing a screw of the kind described above such that it can be secured against unintentional loosening with as little work as possible. This problem is solved by the invention by the fact that a plastic mass filling the slot partially or entirely is provided in the slot.

Such a screw is only slightly more expensive than a screw unsecured against unintentional loosening. Therefore one can use such screws with locking means at basically little additional cost and thus prevent unintentional loosening of the screws. Since the mass according to the invention is plastic it does not interfere with the drawing together of the shaft halves when the threaded shaft is pressed axially into a threaded hole. The screw according to the invention can therefore be inserted at first axially into a threaded hole while the mass is compressed in its slot.

It is especially desirable if, according to an advantageous embodiment of the invention, the mass is an elastic polymer. Such a mass is especially cheap and brings about an effective screw lock.

To further increase the holding power of the screw lock it is helpful if, according to another embodiment of the invention, the mass is a fiber material or synthetic material mixed with fibers or a composite material of synthetic material and metal.

The force involved in inserting the screw is especially low if the mass is a synthetic material mass, such as a lacquer, which hardens under pressure.

Since when the screw is inserted into a threaded hole the shaft halves are forced together from both sides of the slot, the mass in the slot can pass out of it upon insertion so as to exercise the locking function, so that it does not interfere with insertion if the mass reaches no further than the outer contour of the threaded shaft.

If especially great locking forces are required, however, provision can be made for the mass to protrude on both sides of the slot beyond the contour of the outside diameter of the threaded shaft.

The mass can be reliably anchored in the slot if the screw shaft has at least one transverse bore leading into the slot and the mass reaches into this transverse bore.

It contributes to a further increase of the holding power if the mass at the same time coats at least a portion of the circumferential surface of the threaded shaft.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
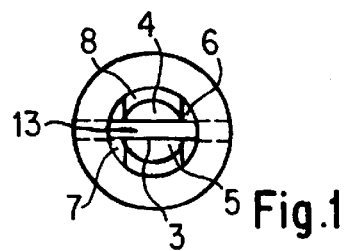
FIG. 1 is a front end view of a screw according to the present invention.
Figure 2:
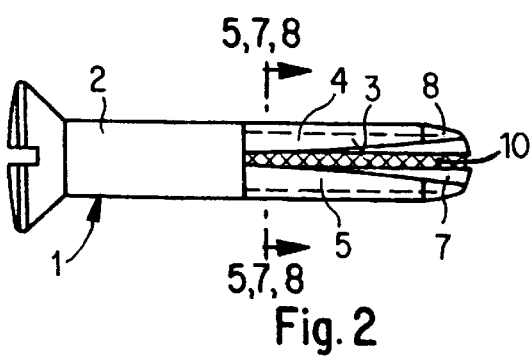
FIG. 2 is a side elevational view of the screw according to the present invention.
Figure 3:
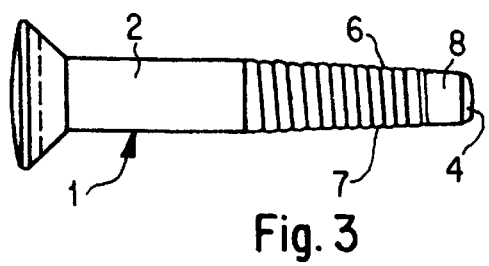
FIG. 3 is a side view of the screw rotated 90° from that of FIG. 2.

FIGS. 1, 2, and 3 show a screw 1 which is configured as an oval-headed screw. It will be appreciated that the shape or configuration of the head does not affect the novel inventive characteristics of the instant invention. The invention is not, therefore, limited to any particular shape or configuration of screw head. The screw has a threaded shaft 2 which has a centrally disposed slot 3 running lengthwise, which divides the front portion of the threaded shaft 2 into two halves 4 and 5. On the two longitudinal sides of the threaded shaft 2, two free surfaces 6 and 7 perpendicular to the slot 3 are provided, which are arranged at an acute angle to one another. The front part of the threaded shaft 2 is provided with a conical taper 8.

Figure 4:
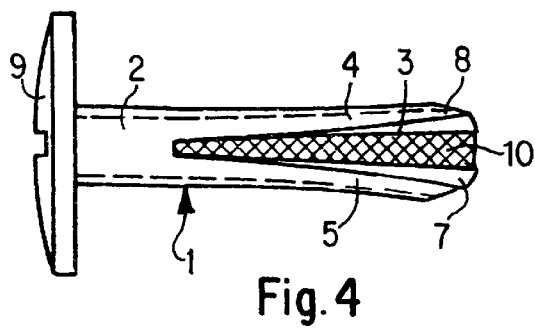
FIG. 4 is a side view of a second embodiment of a screw of the present invention.

The screw 1 shown in FIG. 4 differs from the screw 1 previously described, especially by having a broad-surface screw head 9. Such screws are used especially for covering dowel fasteners and as screws for holding the backs of shelving. In the case of the illustrated screw 1, due to the use to which the screw will be put, the two shaft halves 4 and 5 of the threaded shaft 2 are made resiliently yielding and spread apart from one another. For this purpose the threaded shaft 2 and the broad-surfaced screw head 9 are made preferably from an elastic plastic or an aluminum-magnesium alloy by the pressing or injection molding method. If the screw 1 is made of steel, the springing action of the shaft halves 4 and 5 can be produced by appropriate material selection and shaping methods or after manufacture by hardening and tempering methods.

Important for the invention is a moldable mass 10 which is provided in the slot 3. This mass serves to lock the screw. It can be provided over the entire length of the slot 3 or only over a portion of its length.

Figure 5:
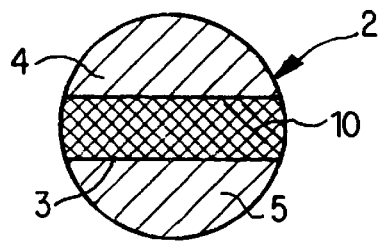
FIG. 5 is a section through the threaded shaft of FIG. 2 showing one embodiment of the invention.
Figure 6:
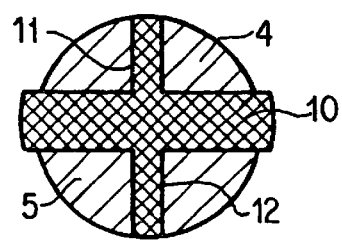
FIG. 6 is a section through the threaded shaft of FIG. 9.

FIG. 5 shows that the mass can finish flush with the outside contour of the threaded shaft 2. It is also possible, however, for the mass 10 to protrude slightly beyond the outer contour of the threaded shaft 2, which is shown in FIG. 6. FIG. 6 likewise shows two transverse bores 11 and 12 which pass through the shaft halves 4 and 5 into the slot 3 and are likewise filled with the mass 10. Thus the mass 10 is reliably anchored in the slot 3. The mass 10 can also protrude slightly from the transverse bores 11 and 12 in order to increase the holding power of the screw 11 in a threaded hole.

Figure 7:
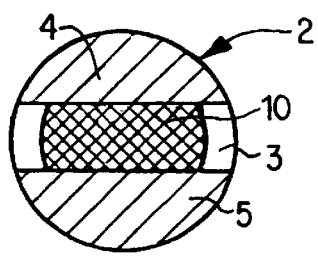
FIG. 7 is a section through the threaded shaft of FIG. 2 showing another embodiment of the invention.

In the embodiment according to FIG. 7, the mass 10 in slot 3 does not reach as far as the outer contour of the threaded shaft 2. If the shaft halves 4 and 5 approach one another when the screw 1 is inserted into a threaded hole, the mass 10 is then compressed and thus runs against the threads.

Figure 8:
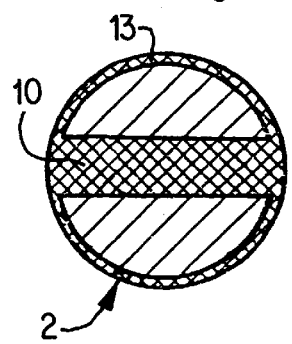
FIG. 8 is a section through the threaded shaft of FIG. 2 showing another embodiment of the invention.
Figure 9:
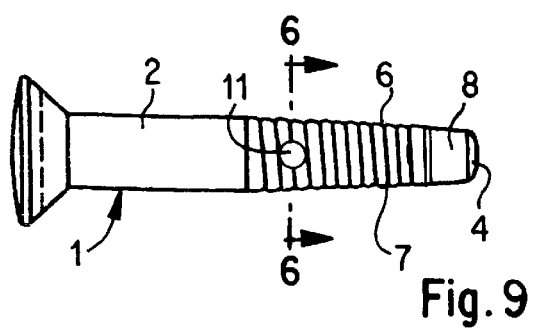
FIG. 9 is a side view showing another embodiment of the invention.

In the embodiment according to FIG. 8, the mass 10 simultaneously forms a covering 13 which blankets at least a portion of the threaded shaft 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A screw comprising:
   a threaded shaft having a slot running along a longitudinal axis of the screw and dividing the threaded shaft into at least two resilient shaft portions comprising means for allowing the shaft portions to be pushed together when the screw is pushed at first axially into a threaded hole whereby threads of the screw slip over threads of the hole by the shaft halves approaching each other; and
   wherein a mass at least partially fills the slot and is deformable to such an extent that it substantially does not interfere with the approaching of the shaft halves when the threaded shaft is pressed into the threaded hole.

2. A screw according to claim 1, wherein the mass is an elastic polymer.

3. A screw according to claim 1, wherein the mass is a fiber material.

4. A screw according to claim 1, wherein the mass is a synthetic material mixed with fiber.

5. A screw according to claim 1, wherein the mass is a composite material of synthetic material and metal.

6. A screw according to claim 1, wherein the mass is a synthetic material.

7. A screw according to claim 6, wherein the mass is a lacquer.

8. A screw according to claim 6, wherein the mass is a varnish which hardens under pressure.

9. A screw according to claim 1, wherein the mass reaches only as far as the outer contour of the threaded shaft.

10. A screw according to claim 1, wherein the mass projects on both sides of the slot past the contour of the outside diameter of the threaded shaft.

11. Screw according to claim 1, wherein the threaded shaft has at least one transverse bore leading into the slot and the mass reaches into this transverse bore.

12. Screw according to claim 1, wherein the mass at the same time coats at least a portion of the periphery of the threaded shaft.

* * * * *